2,839,412

WATER AND OIL EMULSION DUPLICATING INK

Edward J. Igler, Carpentersville, and Clarence J. Shoemaker, Elmhurst, Ill., assignors to A. B. Dick Company, Niles, Ill., a corporation of Illinois No Drawing. Application September 21, 1956
Serial No. 611,342

4 Claims. (Cl. 106—29)

This invention relates to emulsion inks for use in stencil duplication, and it relates more particularly to an ink of the type described for use in automatic stencil-duplicating equipment and in which the aqueous phase which is dispersed in an oil contains the color pigment dispersed therein.

Water-in-oil emulsion duplicator inks have heretofore been prepared, but their use is looked upon with disfavor because of the detrimental effects that the ink composition has on various metal parts of a duplicating machine. Parts formed of copper, brass, bronze and the like copper-bearing materials are especially subjected to accelerated corrosion and deterioration when exposed to emulsion-ink compositions. While accelerated corrosion and deterioration may be the result of a number of conditions existing, it appears that the alkali metal soaps or the amine fatty-acid soaps employed in the ink compositions as an emulsifying or surface-active agent are contributing factors to the accelerated corrosion. It may be that other factors, such as the aqueous medium alone, or more probably in combination with the alkali or amine soaps accelerated corrosion, but, whatever the reason, it is known that the parts formed of copper, brass, and bronze require frequent replacement and repair.

Stable water-in-oil emulsion duplicator inks of the type described are desirable to fill out the line of stencil-duplicating inks for every service and every occasion. Thus, considerable research and development work has been devoted to the preparation of an emulsion ink that will have sufficient stability to stand up over long periods of use or storage; which has sufficient color itensity to produce copy of acceptable quality; which has the desirable flow characteristics for use in automatic duplicating machines; which is easily prepared of low-cost materials and which is formulated of elements which, in combination, are less corrosive than the emulsion inks that have heretofore been employed, and it is an object of this invention to produce and provide a method of producing same.

More specifically, it is an object of this invention to produce and to provide a method for producing an emulsion ink for stencil duplication which has good shelf life, which has good working life, which has desirable flow characteristics for use in automatic duplicating machines, which has good color intensity for the production of copy of good quality, which can be prepared in various colors, which is formulated in a simple and expedient manner of low-cost and readily available materials, which is relatively non-corrosive to metal parts, such as parts formed of copper, brass, or bronze, and which is formed with an aqueous phase as the dispersed phase in oil and in which the pigment is present as a dispersed phase in the aqueous system.

It has been found, in accordance with the practice of this invention, that an emulsion duplicator ink embodying the objectives described can be prepared for use in stencil-duplicating machines with an aqueous medium as the dispersed phase and with an oil as the continuous phase when use is made of an aluminum stearate, preferably a non-gelling aluminum stearate as the surface-active or emulsifying agent in the ink composition. An aluminum stearate of the type preferably employed in the practice of this invention is characterized by the fact that it is considerably less able to cause thickening or gelling of mineral oil when heated as compared to ordinary aluminum stearate. It is believed that aluminum stearates having non-gelling characteristics is achieved by combination of the aluminum stearate with a peptizing agent, such as an agent having a highly polar molecule as illustrated by glycerin, tricesyl phosphate, polyhydric alcohols, organic amines, and the like peptizing agents. Usually the peptizer is combined with the aluminum stearate, in treatment, in amounts ranging from 1.25% by weight of the aluminum stearate. An aluminum stearate capable of use is represented by the trade name Witco #10, marketed by the Witco Chemical Company. The amount of aluminum stearate in the water-in-oil emulsion duplicator ink can range from 0.2% to 5.0% by weight of the ink composition.

When an aluminum stearate of the type described is employed in the system which contains a pigment dispersed in aqueous phase, and when the aqueous phase is dispersed in the continuous oil phase, a stable composition is secured which has little, if any, corrosive effect on the metal parts of the duplicating machine.

As the continuous phase, use can be made of any of the conventional oils used in stencil-duplicating inks. It is preferred, however, to make use of a mineral oil as the oil phase because of its ready availability, low cost, stability, clarity, and relative inertness. The amount of oil in the water-in-oil emulsion duplicator ink can be varied within the range of 50% to 90% by weight of the ink composition.

The pigment dispersed in the aqueous system is preferably formed of a carbon black, lamp black or other black pigment. Instead, use can be made of colors of the pigment type capable of being dispersed in the aqueous system. The amount of pigment dispersed in the aqueous system can be varied within 10% to 50% by weight of the aqueous composition. Ordinarily, the aqueous phase containing the dispersed pigment will make up the remainder of the ink composition except for the small amount of aluminum stearate. Thus the ink composition may be formulated to contain the materials within the range of 50% aqueous phase and 50% oil to 10% aqueous phase and 90% oil.

Rosin and rosin derivatives, such as a hydrogenated rosin, can be used in small amounts from 0% to 15% by weight of the ink composition to improve the characteristics of the ink. Use can also be made of additional surface-active agents such as alkyl sulfonates, as represented by $C_{12}$ alkyl sodium sulfo succinate. The additional surface-acting agent may be employed in the ink composition in amounts ranging from 0% to 3.0% by weight.

The following examples, which are given by way of illustration but not by way of limitation, are representative of ink compositions embodying the features of this invention.

EXAMPLE I

| | Percent |
|---|---|
| Mineral oil | 79.5 |
| Al stearate (Witco #10) | .5 |
| Dispersed black (35%) in water | 20.0 |
| | 100.0 |

EXAMPLE II

| | Percent |
|---|---|
| Mineral oil | 69.7 |
| Al stearate (Witco #10) | 0.3 |
| Staybellite #742 (hydrogenated rosinate) | 12.0 |
| Dispersed black (35%) in water | 18.0 |
| | 100.0 |

EXAMPLE III

| | Percent |
|---|---|
| Mineral oil | 75.7 |
| Al stearate | 0.4 |
| Surface active agent TR | 1.5 |
| 35% dispersed black in water | 22.4 |
| | 100.0 |

Surface-active agent TR is a $C_{12}$ alkyl sulfo succinate.

*Preparation*

In a preferred method of preparation, about 40% to 50% of the oil component is heated to a temperature of about 200° to 275° F. The aluminum stearate is added to the heated oil for solution and then the material is cooled down to a temperature of about 190° F. The dispersed pigment in aqueous medium is added with thorough mixing, and then the composition is milled by one or two passes through a conventional ink mill or grinder. After milling, the remainer of the oil is added and the ink composition may again be milled, if desired.

When the ink composition embodies a hydrogenated rosinate, as in Example II, the rosinate is incoparated into the oil along with the aluminum stearate. The rosinate, as in Example II, operates to give better performance characteristics of the ink composition and to improve its stability.

When a surface-active agent is embodied in the ink composition, as in Example III, it also is added to the heated oil for combination therewith at about the same time that the aluminum sterate is incorporated.

Ink compositions formulated in accordance with the practice of this invention are capable of long shelf life and good stability in use. By comparison with water-in-oil emulsion inks heretofore employed, the attack on such metals as copper, brass, and bronze is relatively negligible.

It will be understood that the ingredients of the water-in-oil emulsion duplicating ink may be combined other than in the preferred method described to achieve the desired ink system, and that other changes may be made in the details of formuation and materials without depart- from the spirit of the invention, especially as defined in the following claims.

We claim:
1. A water-in-oil emulsion duplicating ink composition formed of an oil as a continuous phase and an aqueous pigment dispersion as the dispersed phase and a non-gelling aluminum stearate as the emulsifying agent in which the materials are present in the ratio of 50 parts by weight of oil and 50 parts by weight of pigmented aqueous dispersion to 90 parts by weight of oil and 10 parts by weight of pigmented aqueous dispersion and in which the non-gelling aluminum stearate is present in an amount within the range of 0.2% to 5.0% by weight of the ink composition.

2. A water-in-oil emulsion stencil-duplicating ink as claimed in claim 2 in which the non-gelling aluminum stearate comprises a peptized aluminum stearate.

3. A water-in-oil emulsion duplicating ink composition formed of an oil as a continuous phase and an aqueous pigment dispersion as the dispersed phase, a non-gelling aluminum stearate as the emulsifying agent dissolved in the oil and a material selected from the group consisting of rosin, rosin derivatives, and hydrogenated rosins dissolved in the oil in which the materials are present in the ratio of 50 parts by weight of oil and 50 parts by weight of aqueous dispersion to 90 parts by weight of oil and 10 parts by weight of aqueous dispersion and in which the non-gelling aluminum stearate is present in an amount within the range of 0.2% to 5.0% by weight of the ink composition and in which the rosin compound is present in an amount ranging from 1% to 15% by weight of the ink composition.

4. A water-in-oil emulsion ink as claimed in claim 1 which contains sulfonated aryl compound as an additional emulsifying agent present in an amount up to 3.0% by weight.

References Cited in the file of this patent

UNITED STATES PATENTS

| 1,421,625 | Ward | July 4, 1922 |
| 1,738,798 | Richter et al. | Dec. 10, 1929 |
| 2,289,316 | Myers | Nov. 16, 1939 |
| 2,450,534 | Voet | Oct. 5, 1948 |